United States Patent [19]
Roqueta

[11] Patent Number: 5,458,006
[45] Date of Patent: Oct. 17, 1995

[54] GAS-METERING DEVICE

[75] Inventor: Alexander Roqueta, Laguna Niguel, Calif.

[73] Assignee: Pacific Energy, Commerce, Calif.

[21] Appl. No.: 807,764

[22] Filed: Dec. 6, 1991

Related U.S. Application Data

[63] Continuation of Ser. No. 575,275, Aug. 30, 1990.

[51] Int. Cl.⁶ ..................................................... G01F 1/34
[52] U.S. Cl. ..................................... 73/861.42; 73/861.65; 73/861.61
[58] Field of Search ............................ 73/861.42, 861.52, 73/861.61, 861.63, 861.64, 861.65, 195, 198, 863.33, 155; 166/250, 369

[56] References Cited

U.S. PATENT DOCUMENTS

| | | | |
|---|---|---|---|
| 1,145,234 | 7/1915 | Dodge | 73/861.66 |
| 2,197,214 | 4/1940 | Hollander | 73/861.64 |
| 2,379,138 | 6/1945 | Fitting, Jr. et al. | 73/155 |
| 2,487,083 | 11/1949 | Warshaw | 73/861.61 X |
| 2,564,272 | 4/1951 | Morton | 73/861.61 |
| 3,326,041 | 6/1967 | Reed | 73/861.64 |
| 4,557,296 | 12/1985 | Byrne | 73/861.61 X |
| 4,757,709 | 7/1988 | Czernichow | 73/861.65 X |
| 4,799,388 | 1/1989 | Hunter | 73/861.63 X |

*Primary Examiner*—Richard E. Chilcot, Jr.
*Assistant Examiner*—Harshad Patel
*Attorney, Agent, or Firm*—Christie, Parker & Hale

[57] ABSTRACT

A metering pipe is telescoped, at least partially, within a pipe through which gas flow rate is to be measured. Gas flow is routed through the metering pipe and is measured by means of pressure sensors monitoring gas pressure therein.

5 Claims, 6 Drawing Sheets

Fig. 1

GAS-METERING DEVICE

CROSS-REFERENCE TO RELATED APPLICATIONS

This is a continuation of application Ser. No. 07/575,275, filed Aug. 30, 1990.

BACKGROUND OF THE INVENTION

The present invention is related to devices for metering the rate of single-phase gas flow in gas pipes and, more particularly, to such metering devices for use in landfills.

Landfills are a valuable source of methane gas. Waste products from households and businesses, which over time accumulate in landfills, initially decompose under aerobic conditions, under which the composition requires free oxygen. After substantially all of the available free oxygen has been consumed, decomposition becomes anaerobic, at which point methane and carbon dioxide are generated.

In its simplest form, methane may be recovered from the landfill by means of a well casing, typically a cylindrical pipe, which is sunk into the landfill substantially to its bottom. The casing is perforated toward its bottom and suction is applied at its top so as to impose a pressure gradient in the landfill, with pressure diminishing from an area around the casing toward the casing itself. In this way, methane is withdrawn by suction from a field which surrounds the casing through the casing's perforations and up through the casing by advection.

There is a limit to the size of a field that can be served by a single casing. The limiting factor is the maximum allowable air inflow into the landfill which is induced by the advection created by the suction process. If the rate of flow is increased beyond a certain limit, air flow, and hence intrusion of oxygen into the landfill, becomes excessive, in that decomposition becomes again at least partly aerobic, an undesirable condition.

To overcome the above limitation, large landfills are typically served by a network of well casings, each serving a limited region, with individual casings in the network typically being connected through lateral pipes to one or more common blowers/compressors which create the suction necessary to maintain gas flow from the landfill up through the individual well casings. In order to ensure optimum pressure gradients throughout the landfill, it is necessary to monitor the rate of gas flow through the individual well casings. Three techniques for measuring such gas flow may be identified: 1) the uniform long pipe (ULP), 2) velocity pressure metering, and 3) the orifice meter.

The ULP technique involves a long pipe in which gas pressure is measured at widely separated positions so as to detect the pressure drop between them. Since the pressure drop between the two positions will be proportional to the distance between them, and inversely proportional to the cross-sectional area of the pipe, the necessary length of pipe will be dictated by the flow rate, by the sensitivity of the pressure sensors, and by the cross-sectional area of the pipe. In order to obtain a measurable pressure drop, the length of the ULP is typically many times its diameter. This creates a placement problem.

Velocity pressure metering senses gas velocity at a point within a pipe by sensing total gas pressure at that point and static pressure at or near that point and effectively subtracting static from total pressure to yield velocity pressure. From velocity pressure, gas flow rate may be readily derived. The total and static pressure pickups may be either separate or integrated into a common pitot tube, a well-known pressure sensor. A pitot tube, for measuring gas pressure within a pipe, typically comprises a pair of concentric tubes extending axially along the interior of the pipe. The inner tube has an opening facing upstream, and the outer tube has an opening oriented perpendicular to the direction of flow. Total pressure is sensed through the inner opening; static pressure through the side opening. Velocity pressure at the tip of the concentric pipes is derived from the difference between the two pressures. In order to eliminate disturbances in gas flow at the point of measurement, and create a smooth, concentrically symmetric flow regime, it is necessary to place the pressure sensors, such as the pitot tube, in a portion of the pipe which extends a number of (typically 10) pipe-diameters upstream from the point of measurement and a number of (typically 5) pipe-diameters downstream from that point. The resulting multiple-pipe-diameter section is referred to as a "meter-run" and must be provided and placed in series with the pipe in which gas flow is to be measured.

An orifice meter comprises an orifice plate that is interposed in a pipe by dividing the pipe into sections with ends which abut opposite faces of the orifice plate. The latter has an orifice through its center, and the pipe sections have openings, or "taps," through their sides. Gas flow through the compound pipe comprising the sections is measured by monitoring the pressure differential between the taps respectively upstream and downstream of the orifice plate. The same rule of multiple pipe-diameters upstream and downstream from the point of measurement applies to the orifice meter as well as to the velocity pressure metering.

All three common techniques for measuring gas flow involve a substantial length of pipe that must be free from bends or any other types of obstruction. Room for such a length of straight, unobstructed pipe may be difficult to come by in a landfill. This is particularly so because, in order to protect the instruments connected to the "meter-run," it would be desirable to enclose it in a vault box, which is normally installed over the wellhead, to limit access to the flow control valve, which is usually placed at the wellhead.

SUMMARY OF THE INVENTION

In accordance with the present invention, there is provided a gas-metering device which greatly reduces, and may eliminate entirely, the need to provide space for a metering run external of the pipe through which gas flow is to be measured. In accordance with the invention, the gas-metering device comprises a metering pipe which extends along at least part of its length within the gas pipe. The gas which flows within the gas pipe is caused to flow through the metering pipe in which gas flow is measured. Preferably, the metering pipe is coaxial with the gas pipe and is placed within the gas pipe along, essentially, its entire length, so that only its end protrudes. The means for measuring flow rate within the metering pipe may include a pair of static pressure sensors, with an orifice plate between them, or it may comprise a velocity pressure sensor such as a pitot tube. Alternatively, the metering pipe may be of uniform diameter, along which static gas pressure is measured at two separate points, with sufficient distance between the two points to obtain measurable pressure differential readings. The gas pipe may either comprise a landfill well casing or a gas pipe which is connected to, and extends laterally from, that well casing. Even though the metering pipe is partially or entirely telescoped within the gas pipe through which flow is to be measured, it is preferred that the metering pipe have a length, both upstream and downstream of the point of measurement, that is at least a number of times its diameter.

The described gas metering device is provided at each of a plurality of wellheads in an underground gas-collecting system. The wellheads draw gas to the surface from a plurality of localized areas in the ground. A blower above ground generates a negative pressure gradient. A network of lateral pipes on the surface connect the wellheads to the blower, thereby collecting gas from the wellheads using the negative pressure gradient of the blower. The flow rate in each of the wellheads is monitored by one of the gas metering devices. According to one feature of the invention, the metering pipes are free of any obstructions between two points at which the pressure in the pipe is sensed. According to another feature of the invention, the end of the metering pipes protrude from the wellhead through a bushing and elbows couple the end of the metering pipes to the lateral pipe network.

BRIEF DESCRIPTION OF THE DRAWINGS

These features and advantages of the invention, as well as other features and advantages of the invention, will be more apparent from a reading of the claims and of the detailed description of the invention, in conjunction with the drawings described below.

DETAILED DESCRIPTION

Figure 1:
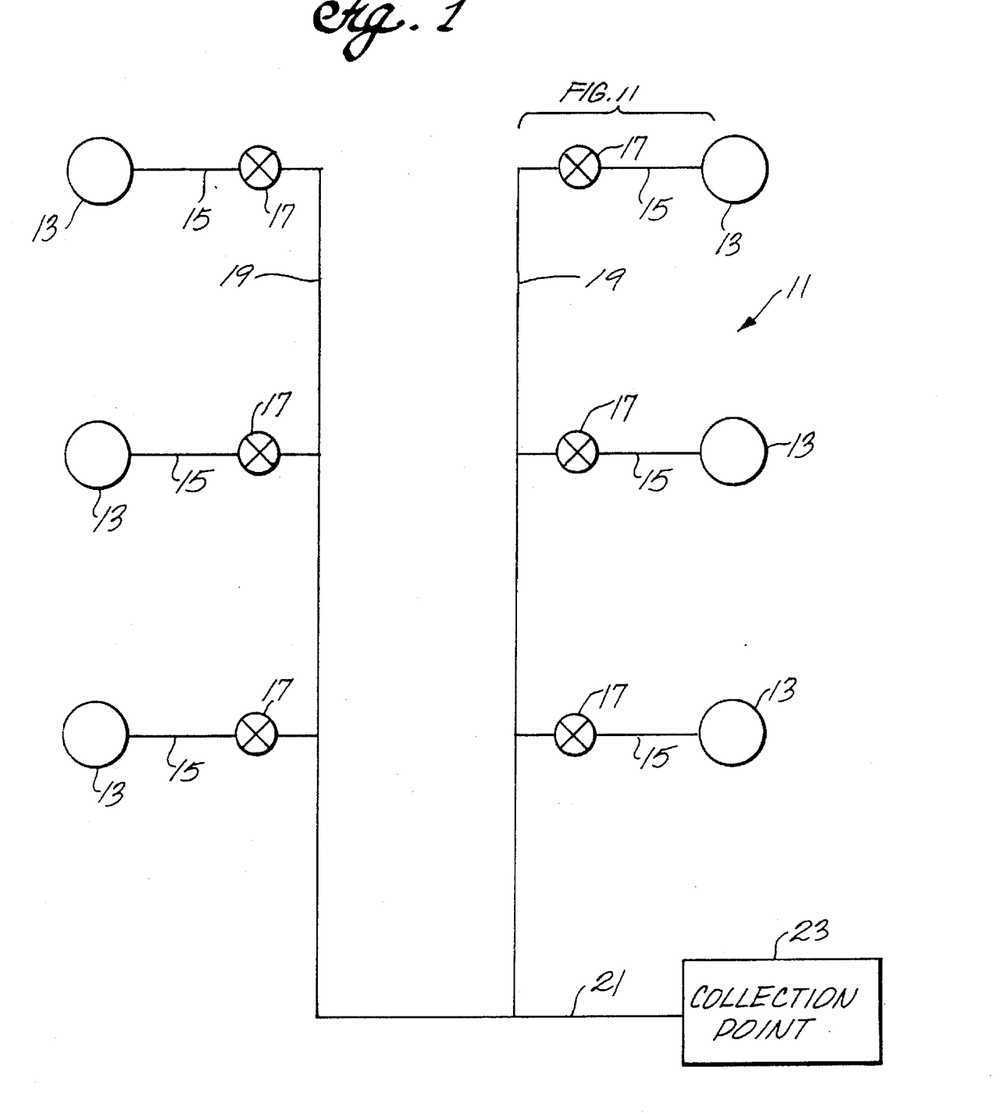
FIG. 1 is a schematic representation of a landfill gas recovery system.

A typical landfill gas recovery system is illustrated in FIG. 1. It comprises a plurality of wellheads 13 which are long, vertical pipes sunk into the landfill. Each wellhead is connected through a well connector, which is a length of pipe running laterally from the wellhead through a valve 17 to another length of pipe, called a "lateral." In the illustrated system, each lateral 19 carries the output of three wellheads to yet another length of laterally-extending pipe 21, called a "header," which goes to a common collection point 23. At that collection point, one or more air blower(s) induce(s) a partial vacuum through the header 21 to the laterals 19, the valves 17, the well connectors 15, and the wellheads 13 in the landfill, causing gases to be sucked out of the landfill into and through the collection point 23.

Figures 2, 3, 4:
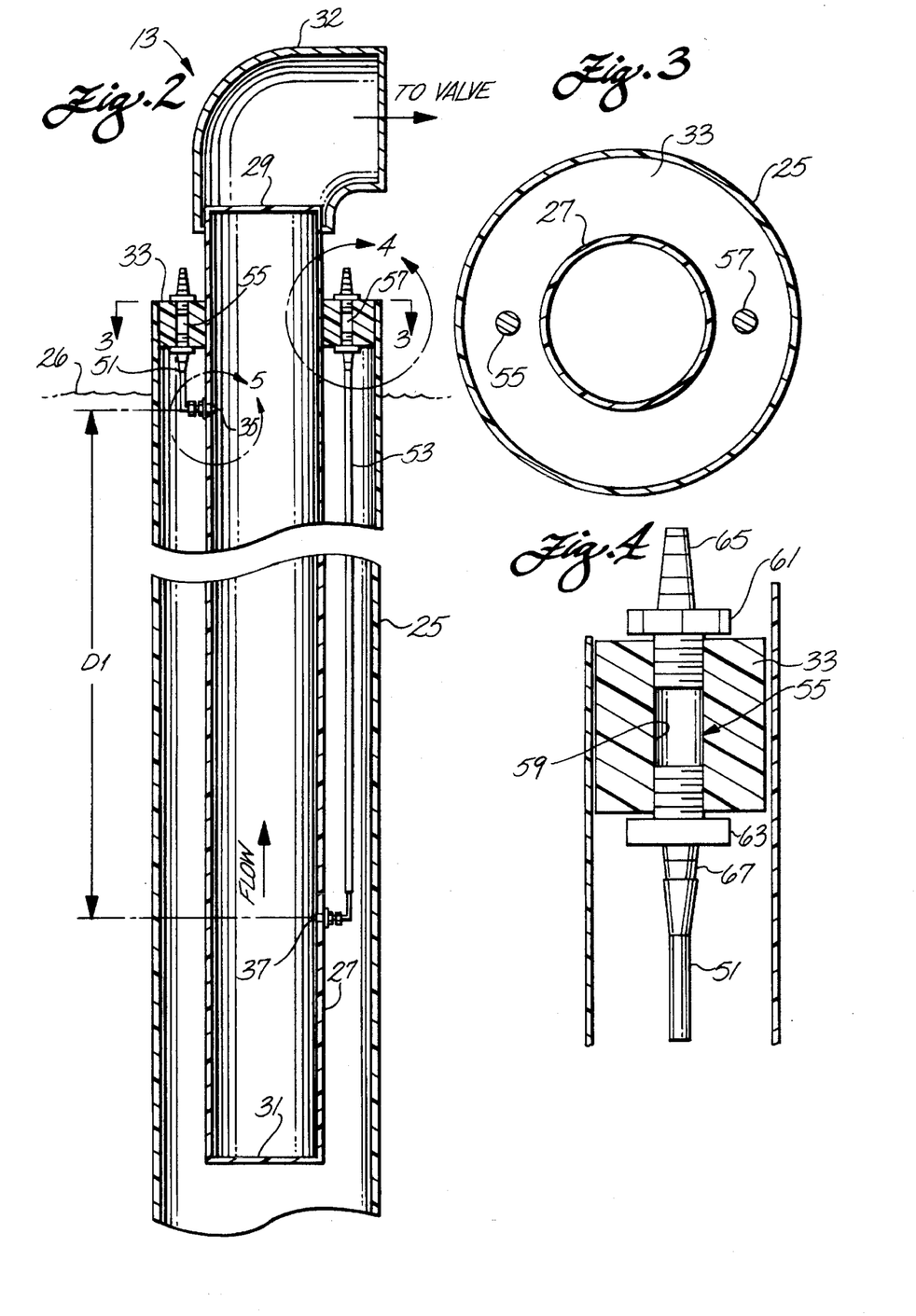
FIG. 2 is a first embodiment of a wellhead for use in the system of FIG. 1 wherein gas flow rate in a fully-enclosed metering pipe is monitored by means of a pair of spaced-apart static pressure sensors.
FIG. 3 is an end view of the wellhead shown in FIG. 2, illustrating a bushing which terminates the wellhead and through which a pair of feedthroughs extend.
FIG. 4 is a cross-section through FIG. 3, illustrating one of the feedthroughs extending through the bushing of FIG. 3.

As described above, the present invention is directed to an improved way of monitoring gas flow rate, either in the wellhead 13, the well connector 15, the lateral 19, or the header 21. A first preferred embodiment of a wellhead is illustrated in FIG. 2. It includes a well casing 25, typically a schedule 40 PVC pipe 4"–6" in diameter, buried in the ground (whose surface is shown at 26). Mounted within the well casing 25, preferably coaxially therewith, is a metering pipe 27, open at its upper and lower ends 29 and 31. The metering pipe 27 is essentially fully enclosed within the well casing 25, being supported near its upper end 29 by a PVC bushing 33, which seals the upper or discharge end of the wellhead, just above ground level 26. The bushing 33 serves as a means to cause all of the gas that flows within the well casing 25 to also flow through the metering pipe 27, whose function is to increase the pressure drop along a given length to above that which would exist for that same length along the wellhead. For this reason, the metering pipe 27 has a substantially smaller diameter than the wellhead, typically 2"–4" in diameter for a wellhead diameter of 4"–6". In other words, a 4" wellhead would accommodate a 2-inch metering pipe, and a 6" wellhead, a 4-inch metering pipe. The metering pipe 27 is essentially fully enclosed within the wellhead 25, extending from it only far enough to accommodate an elbow 32 to which the well connector 15 may be fitted.

Figures 5, 8:
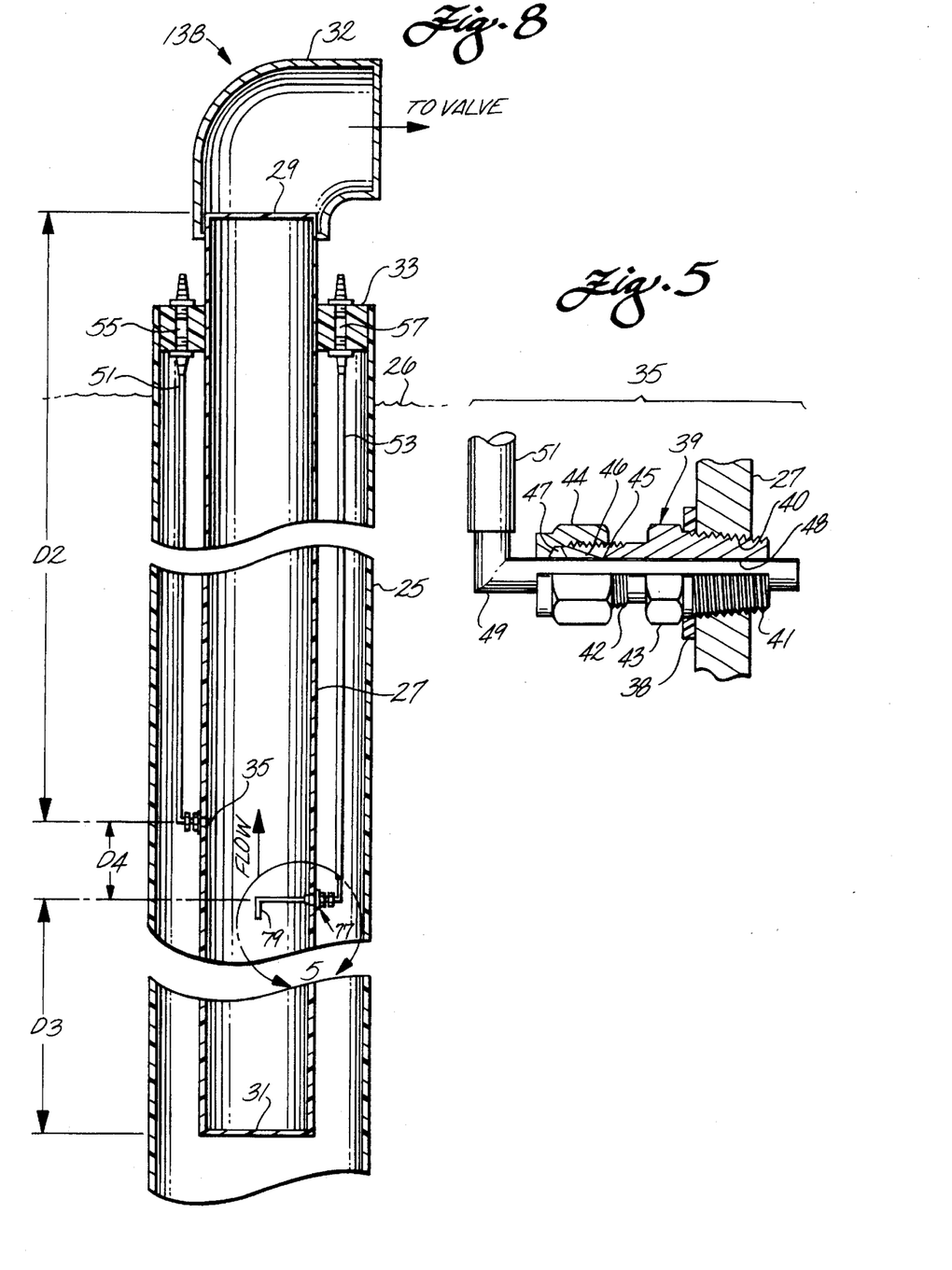
FIG. 5 is a cross-section through one of the pressure sensors illustrated in FIG. 2.
FIG. 8 is a third preferred embodiment of the wellhead of the present invention wherein a gas flow rate in a fully-enclosed metering pipe is monitored by means of a total pressure sensor placed in close proximity to a static pressure sensor.

Gas flow rate is sensed within the metering pipe 27 by means of static pressure sensors 35 and 37, which may be identical. One such pressure sensor 35 is illustrated in FIG. 5. It includes a feedthrough 39, having a pipe-threaded front end 41 and a standard, machine-threaded rear end 42 extending in opposite directions from a hexagonal body 43. The feedthrough is screwed into a pipe-threaded opening 40 in the wall of the metering pipe 27, a washer 38 being sandwiched between the hexagonal body 43 and the pipe 27. The threaded rear end 42 of the feedthrough 39 has an internally-tapered end 45, against which there is positioned a conical washer 46, next to which is located a convex washer 47. A hexagonal cap 44, internally threaded, is mounted on the threaded rear end 42 such that the washers 47 and 46 are sandwiched between the inner end wall of the cap 44 and the internally-tapered end 45 of the feedthrough 39. A passage 48 extends through the cap 44 and the feedthrough 39, and a stainless steel tube 49, typically ¼" in diameter, extends through that passage, terminating just beyond the pipe-threaded end 41. The tube 49 is secured and sealed gas-tight in the feedthrough by tightening the cap 44 upon the threaded end 42, causing the conical washer 46 to be wedged against the internally-tapered end 45 of the feedthrough 39. A hose 51 is slip-fitted, and held by friction, to the outer end of the pipe 49.

The static pressure sensor 37 is constructed exactly like the sensor 35 and terminates in a connecting hose 53. The connecting hoses 51 and 53 are coupled at their upper ends to a pair of identical feedthroughs 55 and 57, anchored in and extending through opposite halves of the bushing 33. One of those feedthroughs is illustrated in FIG. 4. It comprises pair of hose barbs 61 and 63, having tapered and serrated tips 65 and 67 respectively, and adapted to receive and retain the hoses 51 and 53 on the barbs 67 and additional hoses (not shown) on the barbs 65. The hose barbs 61 and 63 have threaded male adapters which screw into a threaded hole 59, which extends through the bushing 33. The additional hoses connect the sensors 35 and 37 to a measuring instrument (not shown), which may be of any of a number of well-known types and which is adapted to convert the pressure readings at the sensors 35 and 37 into a pressure-drop reading, which may in turn be converted, by well-known calculations, into rate of gas flow in the metering pipe 27. For this purpose, the sensors 35 and 37 are spaced apart by a predetermined distance D1, which is selected to provide a long enough, obstruction-free pipe run to cause the pressure drop between the upstream sensor 37 and the downstream sensor 35 to be sufficient to be registered by the pressure-sensing instruments to which the sensors 35, 37 are connected. Typically, this distance will be many times, usually 15 or more, the diameter of the pipe 27. A principal advantage of the invention is that the metering pipe is essentially fully enclosed within the wellhead casing 25, so that the height added to the wellhead by the metering pipe 27 is almost totally eliminated.

Figure 6:
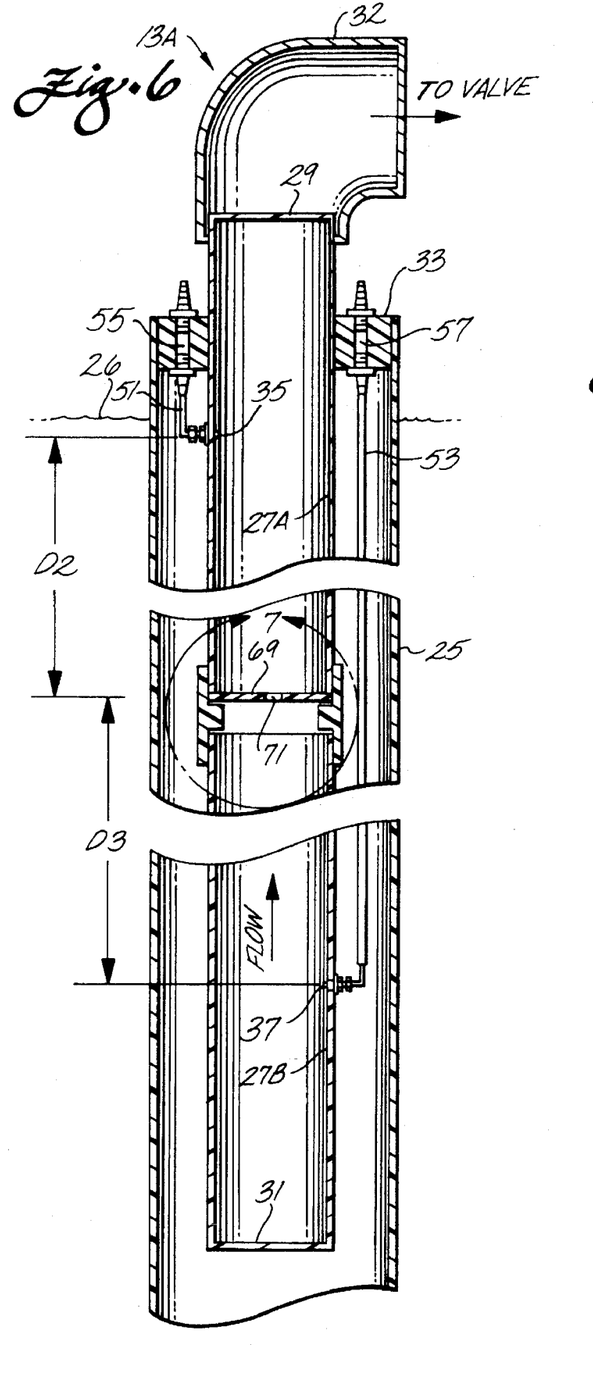
FIG. 6 is a second embodiment of a preferred wellhead wherein gas flow in a fully-enclosed metering pipe is monitored by a pair of pressure sensors located on opposite sides of an orifice plate in the metering pipe.

A second embodiment of the invention is illustrated in FIG. 6. It incorporates a wellhead 13A, identical to that shown in FIG. 2, wherein a metering pipe 27 is mounted exactly as in FIG. 2 and wherein a pair of pressure sensors 35 and 37 are spaced apart by a distance D2+D3. The difference between the FIG. 2 and FIG. 6 embodiments is that the total distance D2+D3 required between the static pressure sensors 35 and 37, is reduced in the FIG. 6 embodiment by the addition of an orifice plate 69 (shown more fully in FIG. 7). The orifice plate 69, having at its center an orifice 71, may be very simply incorporated in the metering pipe 27 by forming the pipe 27 of two sections 27a and 27b joined by a conventional PVC coupler 73, having a central, internal, circumferential ridge 75. The pipe section 27b is inserted through one end of the coupling and bears against one side of the ridge 75, and the other pipe section 27a is inserted through the opposite side of the coupling. Sandwiched between the opposite side of the ridge 75 and the end of the pipe section 27a, is the orifice plate 69. The entire assembly may then be permanently bonded. Typically, all of the pipes and the coupler 73 may be PVC plastic, and the orifice plate itself may be either plastic or stainless steel. In either case, the assembly is bonded by a suitable PVC bonding agent.

Figure 7:
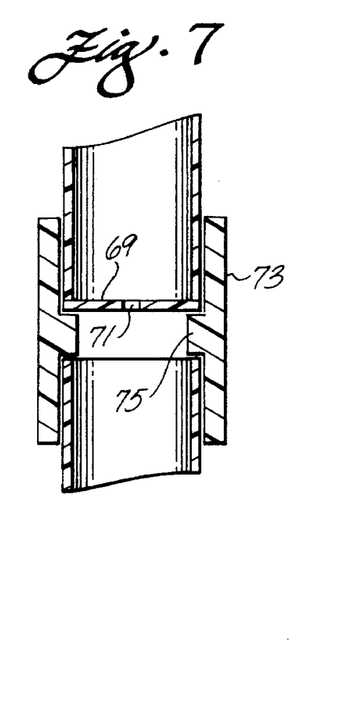
FIG. 7 is an enlarged view of the metering pipe, illustrating the orifice plate.

In operation, the pressure drop through the orifice plate 71 is equal to that which would otherwise occur through a substantial length of the metering pipe 27, so that the total length D2+D3, required to provide sufficient pressure drop between the static pressure sensors 35 and 37, is substantially less than what would be needed without the orifice plate. The use of spaced-apart static pressure sensors in combination with an orifice plate disposed between them is well known and requires that there exist a minimum distance between each of the pressure sensors and the orifice plate 69 in order to ensure that the effects of gas turbulence on the static sensors is sufficiently minimized. Accordingly, the distance D3 between the upstream sensor 37 and the orifice plate should be on the order of 10 times the diameter of the pipe 27, and the distance D2 between the downstream pressure sensor 35 and the orifice plate 69 should be on the order of 5 times the pipe diameter. These distances are somewhat arbitrary, but it is commonly recognized that each distance should be a number of pipe-diameters, and that the number of pipe-diameters between the orifice plate and the upstream sensor should be substantially greater than that between the orifice plate and the downstream sensor.

A third embodiment of the invention is shown in FIG. 8 and comprises a wellhead 13B, constructed just like those illustrated in FIGS. 2 and 6. The wellhead 13B of FIG. 8 incorporates a metering pipe 27, which may be identical to that shown in FIG. 2. The difference between the two wellheads 13 and 13B is that the upstream, static pressure sensor 37 of FIG. 2 is replaced by an upstream, total pressure sensor 77, and the downstream, static pressure sensor 35 is spaced relatively closely from the total pressure sensor 77 by a distance D4, which is on the order of up to 1 metering-pipe-diameter.

Essentially, both pressure sensors 35 and 77 measure pressure at the same point in the pipe. The total pressure sensor 77 may be of the same construction as the static pressure sensor shown in detail in FIG. 5, with the only exception that the tube 49 is replaced by a longer tube 79, which extends toward the center of the metering pipe 27 and terminates in a right angle, so that the tip of the tube 79 faces into the gas flow. The combination of the two sensors 35 and 77 comprises what may be called a "total pressure pickup" (or sensor). Between the two, they register total pressure, static pressure, and velocity pressure. The relationship is expressed as $P_v = P_t - P_s$, where $P_v$ is velocity pressure, $P_t$ is total pressure, and $P_s$ is static pressure. By connecting the static and total pressure sensors 35 and 77 through the hoses 51, 53 and the feedthroughs 55, 57, to appropriate inputs of a pressure measuring device, the subtraction required by the above equation is automatically carried out by that instrument, so that it provides a reading of velocity pressure $P_v$. Velocity pressure $P_v$ may be translated to actual gas velocity, and hence gas flow rate, by either a mathematical calculation or by calibrating the pressure measuring device to indicate velocity and/or flow directly.

Alternatively, the functions of the pressure sensors 35 and 77 may be combined into a single pitot tube that comprises two tubes, one inside and coaxial with the other. The inner tube is configured essentially like the tube 79 in FIG. 8. The outer tube has an opening in its side only, the opening being located a short distance from the tip, so that it faces toward the wall of the metering pipe and perpendicular to the direction of gas flow. In this way, the inner tube measures total pressure, and the outer tube measures static pressure. The foregoing principles of pressure measurement are well known and are described in Bulletin H-100, entitled "Air Velocity Instruments and Air Velocity Transmitter," copyright 1988, by Dwyer Instruments, Inc. of Michigan City, Ind.

In order to sufficiently minimize the effects of gas turbulence on the pressure sensors 35 and 79, the metering pipe 27 should extend downstream, past the static pressure sensor 35, by the distance D2, which equals a first number of metering-pipe-diameters, and should extend upstream by the distance D3, which is at least a second number of metering-pipe-diameters from the total pressure sensor 77. The distance D3 should be greater than D2. Typical distances for D2 and D3 are 5 and 10 metering-pipe-diameters respectively, which correspond to the distances D2 and D3 in the case of the FIG. 6 embodiment. If a pitot tube is used to perform both the static and total pressure sensing, the distances D2 and D3 are measured from the pitot tube to opposite ends of the metering pipe 27.

Figure 9:
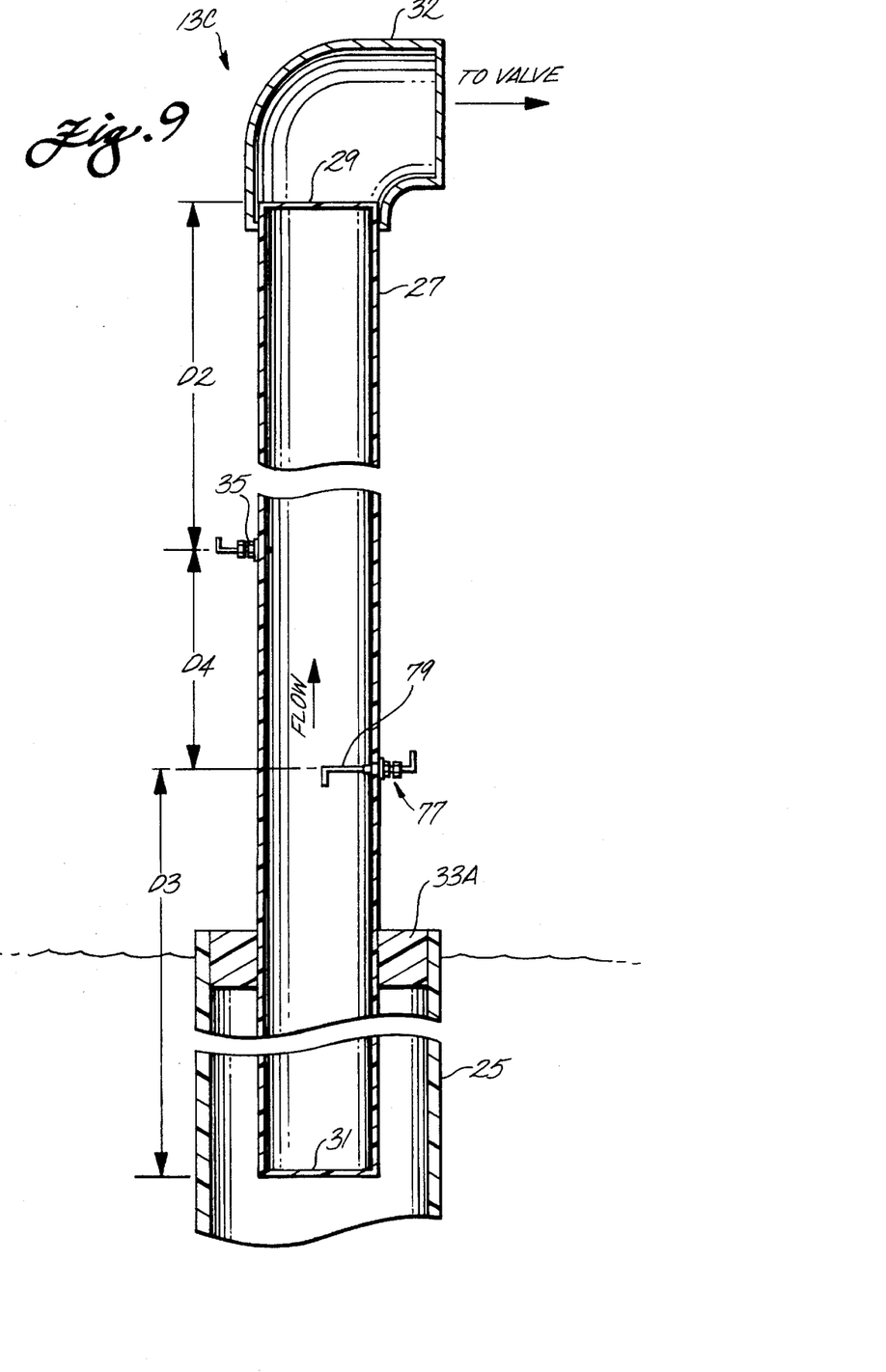
FIG. 9 is a fourth preferred embodiment of the wellhead wherein gas flow rate in a partially-enclosed metering pipe is monitored by means of a total pressure sensor placed closely to a static pressure sensor.

A fourth embodiment of the invention is a wellhead 13C, illustrated in FIG. 9. The wellhead 13C is similar to wellhead 13B of FIG. 8, and corresponding parts are identically numbered. The wellhead 13C of FIG. 9 differs from the wellhead 13B in that its metering pipe 27 is only partially recessed within the wellhead casing 25. This simplifies the connections to the pressure sensors 35 and 79, since they can be located externally to the wellhead casing 25 and need not be led through the bushing which terminates the wellhead and which is identified as 33a in FIG. 9. The bushing 33a has only a single opening for admitting the lower portion of the metering pipe 27, with the bushing 33a being bonded by appropriate means to the wellhead casing 25 so as to seal it. The appropriate distances D2, D3 and D4 for the arrangement of FIG. 9 may be identical to those recited for the corresponding distances with reference to FIG. 8.

Figure 10:
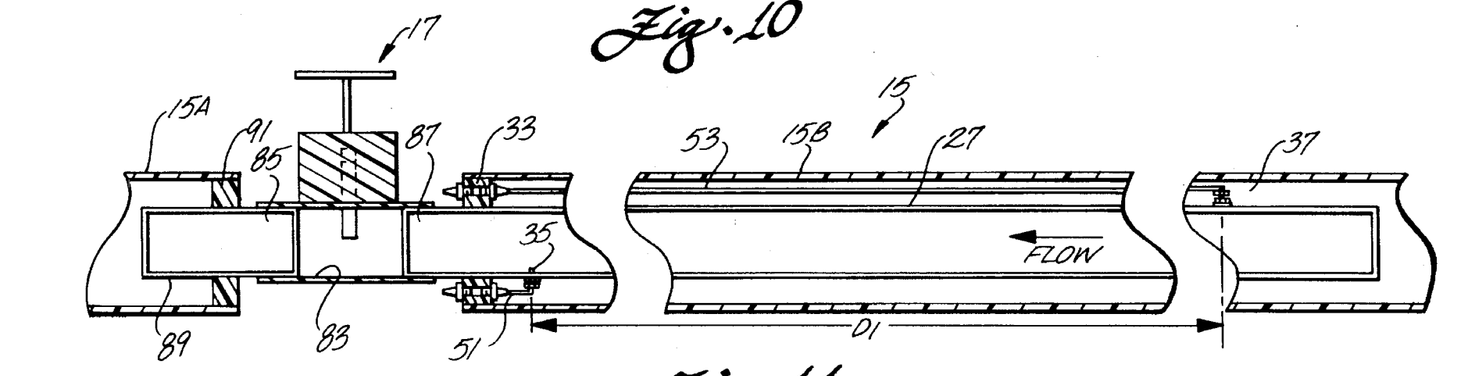
FIG. 10 is a fifth embodiment of the invention wherein a fully-recessed metering pipe is located in a lateral pipe, and gas flow rate in the fully-recessed metering pipe is measured by means of a pair of spaced-apart static pressure sensors.

There have so far been described four embodiments of the present invention, in each of which a metering pipe is disposed inside a wellhead, either essentially fully or partially enclosed therein. In FIG. 10 there is shown an embodiment of the invention wherein the metering pipe 27 is disposed in a lateral pipe, such as one of the well connectors 15 shown in FIG. 1, which extends from a wellhead. Such a well connector 15 is illustrated in FIG. 10 as comprising two segments, 15a and 15b, each of which may be, for example, a length of Schedule 40 PVC pipe 4"–6" in diameter. Interposed between the ends of pipe segments 15a and 15b, is one of the valves 17 having a body 83 with inlets 85 and 87 extending coaxially in opposite directions. The pipe segment 15a is plugged with a bushing 91, through which there extends a pipe stub 89, which enters one of the inlets 85 of the valve. The metering pipe 27 extends from the pipe segment 15b through a bushing 33, such as that illustrated in FIG. 3, far enough to extend into the opposite valve inlet 87. Essentially, the metering pipe 27 is constructed just like its counterpart in FIG. 2. In other words, it is a uniform, long pipe having a pair of static pressure sensors 35 and 37, spaced apart by distance D1 sufficient to produce a measurable pressure drop between the two. As in FIG. 2, static pressure registered by the sensors 35 and 37 is taken out of the pipe segment 15b through feedthroughs that extend through the bushing 33, exactly in the manner illustrated in FIG. 4.

It will be understood that, just as in the case of the wellheads 13, 13A, and 13B of FIGS. 2, 6, and 8, any one of the different pressure-sensing arrangements my be employed in the lateral pipe embodiment of the invention shown in FIG. 10. In other words, the arrangements of FIGS. 6 and 8 may be substituted for the pressure sensor arrangement of FIG. 10. It will be also understood that, if desired, the metering pipe 27 may be only partially recessed in the lateral pipe section 15b, just as it is only partially recessed in the wellhead arrangement of FIG. 9.

Figure 11:
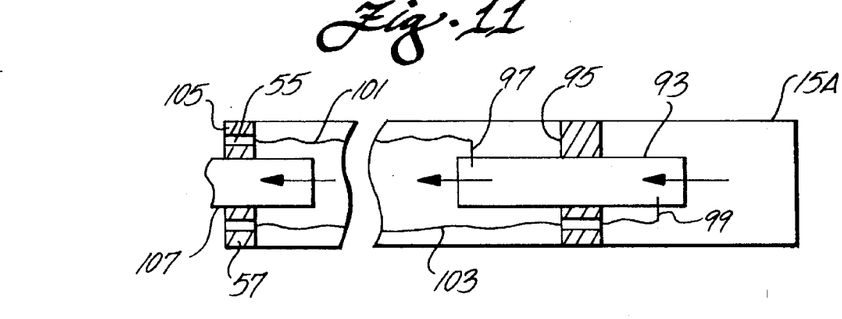
FIG. 11 is a schematic illustration of a lateral pipe in which a metering pipe is mounted in the lateral pipe at some distance from the lateral pipe's inlet.

In all of the embodiments described so far, the metering pipe 27 has been shown as being either essentially fully or partially enclosed within the pipe in which it is inserted. That need not be so. If desired, the metering pipe may be fully recessed within either the wellhead casing or the lateral pipe section 15a so that no part of it extends beyond the end of the pipe in which it is enclosed. Such an arrangement is schematically illustrated in FIG. 11, wherein a metering pipe 93 is shown recessed within a lateral pipe 15a, mounted coaxially therein by means of one or more (one shown) bushing(s) 95. Any one of the pressure-sensing arrangements may be employed, FIG. 11 showing schematically the uniform, long pipe arrangement wherein a pair of static pressure sensors 97 and 99 are disposed toward opposite ends of the metering pipe 93 and are connected respectively through hoses 101 and 103 through a bushing 105, which may be identical to the bushing 33 of FIG. 3. A pipe stub 107, which may be of the same diameter as the metering pipe 93, extends through the bushing 105, to provide coupling to a valve 17 (not shown) in the manner illustrated in FIG. 10. The bushing 95 fulfills two of the three functions performed by the bushing 33. It supports and centers the metering pipe 93 within the lateral pipe section 15a and it serves as a means for causing all of the gas that flows through the pipe 15a to pass through the metering pipe 93.

From the foregoing, it is apparent that there has been provided an improvement in gas flow measuring devices which materially reduces the space required to house metering pipes which previously had required substantial clearance, due to the length required of such metering pipes and the fact that they have to be located externally of the pipe through which gas flow was to be measured.

While the materials and sizes preferred for construction of the pipes and sensors have been specifically called out for the exemplary embodiments described, it will be apparent to those skilled in the art that those materials and sizes are optional and may be varied as the need arises. Changes in construction may also be made without departing from the invention. For example, additional centering and support spacers may be provided for greater stability between the metering pipe and either the well casing 25 or the lateral pipe segment 15b, without adversely affecting gas flow and accuracy of measurement.

What is claimed is:

1. Apparatus for collecting gas from the ground comprising:

blower means above ground for generating a negative pressure gradient;

a plurality of wellheads for drawing gas from a plurality of localized areas in the ground to the surface;

a network of lateral pipes on the surface for connecting the wellheads to the blower means, thereby collecting gas from the wellheads using the negative pressure gradient of the blower means; and means for monitoring the flow rate in each of the wellheads comprising for each wellhead, a metering pipe extending along part of its length within said wellhead such that the end of the metering pipe protrudes from the wellhead and the remainder of the metering pipe lies within the wellhead, the metering pipe having a uniform diameter, means for causing all gas that flows within said wellhead to also flow through said metering pipe to the pipe network, and first and second means for sensing pressure at first and second points of said metering pipe, said metering pipe being free of any obstructions between said first and second points.

2. The apparatus of claim 1, wherein said metering pipe and said wellhead are coaxial.

3. The apparatus of claim 1, wherein said metering pipe has a length which is at least a number of times its diameter.

4. The apparatus of claim 1, wherein said metering pipe extends past both of said pressure-sensing means in one direction along said drawing means by a distance which is at least a first number of times the diameter of said metering pipe and extends past both of said pressure-sensing means in the opposite direction along said pipe by a distance which is at least a second number of times the diameter of said metering pipe, said first number being greater than said second number.

5. Apparatus for collecting gas from the ground comprising:
- blower means above ground for generating a negative pressure gradient;
- a plurality of wellheads for drawing gas from a plurality of localized areas in the ground to the surface;
- a network of lateral pipes on the surface for connecting the wellheads to the blower means, thereby collecting gas from the wellheads using the negative pressure gradient of the blower means; and
- means for monitoring the flow rate in each of the wellheads comprising for each wellhead,
  - a metering pipe extending along part of its length within said wellhead such that the end of the metering pipe protrudes from the wellhead and the remainder of the metering pipe lies within the wellhead,
  - means for causing all gas that flows within said wellhead to also flow through said metering pipe to the pipe network, the causing means comprising, for each wellhead, a bushing through which the end of the metering pipe protrudes from the wellhead and an elbow that couples the end of the metering pipe to the lateral pipe network, and
  - means for sensing gas flow rate within said metering pipe.

* * * * *

REEXAMINATION CERTIFICATE (3197th)

United States Patent [19]
Roqueta

[11] B1 5,458,006
[45] Certificate Issued May 13, 1997

[54] GAS-METERING DEVICE

[75] Inventor: Alexander Roqueta, Laguna Niguel, Calif.

[73] Assignee: Pacific Energy, Commerce, Calif.

Reexamination Request:
No. 90/004,291, Jun. 28, 1996

Reexamination Certificate for:
Patent No.: 5,458,006
Issued: Oct. 17, 1995
Appl. No.: 807,764
Filed: Dec. 6, 1991

Related U.S. Application Data

[63] Continuation of Ser. No. 575,275, Aug. 30, 1990, abandoned.

[51] Int. Cl.$^6$ .................................................. G01F 1/34
[52] U.S. Cl. .................... 73/861.42; 73/861.65; 73/861.61
[58] Field of Search .............. 73/861.42, 861.52, 73/861.61, 861.63, 861.64, 861.65, 195, 198, 863.33, 155; 166/250, 369

[56] References Cited

U.S. PATENT DOCUMENTS

| | | | |
|---|---|---|---|
| 1,145,234 | 7/1915 | Dodge | 138/44 |
| 2,197,214 | 4/1940 | Hollander | 73/213 |
| 2,379,138 | 6/1945 | Fitting, Jr. | 73/155 |
| 2,487,083 | 11/1949 | Warshaw | 73/211 |
| 2,564,272 | 8/1951 | Morton | 73/211 |
| 3,326,041 | 6/1967 | Reed | 73/213 |
| 4,026,355 | 5/1977 | Johnson et al. | 166/246 |
| 4,557,296 | 12/1985 | Byrne | 138/44 |
| 4,757,709 | 7/1988 | Czernichow | 73/155 |
| 4,799,388 | 1/1989 | Hunter | 73/861.63 |
| 5,063,519 | 11/1991 | Zison | 364/510 |

*Primary Examiner*—Richard Chilcot

[57] ABSTRACT

A metering pipe is telescoped, at least partially, within a pipe through which gas flow rate is to be measured. Gas flow is routed through the metering pipe and is measured by means of pressure sensors monitoring gas pressure therein.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–4 and 5 is confirmed.

* * * * *